(12) United States Patent
Bertin-Mourot et al.

(10) Patent No.: US 11,312,658 B2
(45) Date of Patent: *Apr. 26, 2022

(54) MULTI-LAYER INSULATED GLASS UNIT COMPRISING A LOW CTE GLASS LAYER

(71) Applicant: CORNING INCORPORATED, Corning, NY (US)

(72) Inventors: Thomas Bertin-Mourot, Paris (FR); James Gregory Couillard, Ithaca, NY (US); Michael Aaron McDonald, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/955,480

(22) PCT Filed: Dec. 20, 2018

(86) PCT No.: PCT/US2018/066831
§ 371 (c)(1),
(2) Date: Jun. 18, 2020

(87) PCT Pub. No.: WO2019/126521
PCT Pub. Date: Jun. 27, 2019

(65) Prior Publication Data
US 2020/0369565 A1    Nov. 26, 2020

Related U.S. Application Data

(60) Provisional application No. 62/609,069, filed on Dec. 21, 2017.

(51) Int. Cl.
*E06B 3/67*    (2006.01)
*C03C 27/06*    (2006.01)
(Continued)

(52) U.S. Cl.
CPC .............. *C03C 27/06* (2013.01); *C03C 3/091* (2013.01); *E06B 3/677* (2013.01); *E06B 3/6722* (2013.01); *E06B 3/66366* (2013.01)

(58) Field of Classification Search
CPC ...... E06B 3/66; E06B 3/66366; E06B 3/6715; B32B 17/10055
See application file for complete search history.

(56) References Cited

U.S. PATENT DOCUMENTS

| 4,019,295 | A  | 4/1977  | Derner          |
| 6,830,791 | B1 | 12/2004 | Misonou et al.  |
| 8,007,913 | B2 | 8/2011  | Coppola et al.  |
| 8,595,994 | B1 | 12/2013 | Grommesh et al. |

(Continued)

FOREIGN PATENT DOCUMENTS

| DE | 102006039771 A1 | 5/2008 |
| EP | 2982657 A1      | 2/2016 |

(Continued)

OTHER PUBLICATIONS

Machine translation of applicant cited WO 2014/168219. (Year: 2014).*

(Continued)

*Primary Examiner* — Donald J Loney (57) ABSTRACT

An insulated glass unit is described and includes at least a first glass layer, a second glass layer and a third glass layer disposed therebetween. The third glass layer is separated from the first glass layer and the second glass layer by first and second sealed gap spaces. The third glass layer has a low CTE as compared to the CTE of the first and/or second glass layers. In some instances, the third glass layer has a CTE of less than $70 \times 10^{-7}/°$ C. over a temperature range of 0-300° C.

16 Claims, 3 Drawing Sheets

(51) Int. Cl.
*C03C 3/091* (2006.01)
*E06B 3/677* (2006.01)
*E06B 3/663* (2006.01)

(56) References Cited

U.S. PATENT DOCUMENTS

| | | | | |
|---|---|---|---|---|
| 8,883,277 | B2* | 11/2014 | Janssen | E06B 3/6715 |
| | | | | 428/34 |
| 10,448,753 | B2* | 10/2019 | Christiansen | E06B 7/28 |
| 2009/0139163 | A1 | 6/2009 | Prete et al. | |
| 2013/0015180 | A1 | 1/2013 | Godard et al. | |
| 2013/0312459 | A1 | 11/2013 | Coppola et al. | |
| 2014/0290156 | A1 | 10/2014 | Bruce et al. | |
| 2017/0119176 | A1 | 5/2017 | Christiansen et al. | |
| 2017/0152701 | A1 | 6/2017 | Kuster et al. | |
| 2017/0240462 | A1 | 8/2017 | Wagner et al. | |

FOREIGN PATENT DOCUMENTS

| | | | |
|---|---|---|---|
| EP | 3309343 | A1 | 4/2018 |
| GB | 2499646 | A | 8/2013 |
| WO | 2014/018838 | A2 | 1/2014 |
| WO | 2014/168219 | A1 | 10/2014 |
| WO | 2015/200793 | A1 | 12/2015 |
| WO | 2017/019837 | A1 | 2/2017 |
| WO | 2017/044606 | A1 | 3/2017 |
| WO | 2019/126521 | A1 | 6/2019 |
| WO | 2020/028056 | A1 | 2/2020 |

OTHER PUBLICATIONS

International Search Report and Written Opinion of the International Searching Authority; PCT/US2019/068018; dated Mar. 27, 2020, 9 pages; European Patent Office.

International Search Report and Written Opinion of the International Searching Authority; PCT/US2018/066831; dated Mar. 18, 2019; 10 Pages; European Patent Office.

Shetty et al., "Failure probability of laminated architectural glazing due to combined loading of wind and debris impact", Mechanical and Aerospace Engineering Department, Missouri University of Science and Technology, vol. 36, 2014, pp. 226-242.

* cited by examiner

MULTI-LAYER INSULATED GLASS UNIT COMPRISING A LOW CTE GLASS LAYER

CROSS-REFERENCE TO RELATED APPLICATIONS

This application claims the benefit of priority under 35 U.S.C. § 371 of International Application No. PCT/US2018/066831, filed on Dec. 20, 2018, which claims the benefit of priority under 35 U.S.C. § 119 of U.S. Provisional Application No. 62/609,069, filed on Dec. 21, 2017, the content of each of which is incorporated herein by reference in its entirety.

FIELD OF THE DISCLOSURE

The disclosure relates generally to insulated glass units comprising at least one low CTE glass layer. More specifically, the disclosure relates to multi-layer insulated glass units comprising at least one glass layer having a CTE of less than $70 \times 10^{-7}/°$ C. that can be used as multi-pane windows.

BACKGROUND

Insulated glass units (IGUs) are useful as components in a wide variety of applications, including architectural, automobile, display, and appliance components. IGUs may be used as multi-pane windows in buildings or in automobiles to provide insulative properties from external environmental temperatures. An IGU typically comprises two or more sheets of glass sealed at their peripheral edges by a seal. The sheets of glass are spaced apart, and the space between each glass sheet, once sealed, can be filled with an inert gas, such as argon or krypton, or an inert gas mixture. In doing so, the insulative or thermal performance of the IGU can be improved. In addition to thermal and insulative performance, an IGU typically may need to meet other design constraints, including reduced weight, reduced thickness, improved light transmittance, improved mechanical strength, and/or reduced manufacturing cost.

Triple pane IGUs (e.g., three panes of glass with two air cavities) exhibit improved thermal and insulative performance as compared to double pane IGUs (e.g., two panes of glass with one air cavity), as indicated by an improvement of 20-30% or more in solar heat gain coefficient (SHGC) and/or insulative U-values. However, triple pane IGUs may not meet other design constraints, such as reduced weight, thickness and/or manufacturing cost. The additional weight, thickness, and/or manufacturing cost associated with the additional glass layer may adversely affect the IGU such that it does not meet design requirements for certain applications.

Additionally, because the center glass layer is insulated on both sides, it can reach much higher temperatures and therefore higher stress levels than the inner- and outer-facing glass layers. To reduce the likelihood of breakage, the center glass layer is often thermally tempered or heat strengthened to improve its mechanical strength. However, thermal strengthening processes can require a thicker glass substrate, e.g., a thickness of at least about 2-3 mm. As noted above, glass layers at this thickness can undesirably increase the overall thickness and/or weight of the IGU, and the additional tempering step can increase the manufacturing cost of the IGU. Moreover, thermal tempering can warp and/or cause birefringence in the center glass layer, thereby degrading the optical quality of the IGU. As such, it would be advantageous to provide an IGU with improved thermal and/or insulative properties that can also satisfy other design constraints including, but not limited to, reduced weight, thickness, and/or manufacturing cost.

SUMMARY

The disclosure relates, in various embodiments, to insulated glass units comprising a first glass layer, a second glass layer, and a third glass layer disposed between the first and second glass layers, a first sealed gap space defined between the first and third glass layers, and a second sealed gap space defined between the second and third glass layers, wherein the third glass layer has a coefficient of thermal expansion (CTE) over a temperature range 0-300° C. of less than $70 \times 10^{-7}/°$ C.

The disclosure also relates to insulated glass units comprising a first glass layer having a coefficient of thermal expansion $CTE_1$, a second glass layer having a coefficient of thermal expansion $CTE_2$, and a third glass layer disposed between the first and second glass layers and having a coefficient of thermal expansion $CTE_3$, a first sealed gap space defined between the first and third glass layers, and a second sealed gap space defined between the second and third glass layers, wherein at least one of: $CTE_1 > CTE_3$ or $CTE_2 > CTE_3$, as measured over a temperature range of 0-300° C.

According to various embodiments, at least one of the first and second glass layers can have a thickness of greater than about 2 mm. At least one of the first, second, and third glass layers can be chemically strengthened or thermally tempered. In certain embodiments, at least one of an inner surface of the first glass layer, an inner surface of the second glass layer, or a major surface of the third glass layer can be coated with at least one low emissivity coating. According to further embodiments, at least one major surface of the third glass layer can be at least partially patterned with ink or light scattering features. In yet further embodiments, at least one insulating gas or a mixture thereof with air can be used to fill the first and/or second sealed gap spaces.

The insulated glass units disclosed herein may, in certain embodiments, include a fourth glass layer disposed between the first and second glass layers, and a third sealed gap space defined between the third glass layer and the fourth glass layer. In some embodiments, the fourth glass layer can have a coefficient of thermal expansion (CTE) over a temperature range 0-300° C. of less than $70 \times 10^{-7}/°$ C. The third and/or fourth glass layers may, in various embodiments, comprise a boro-aluminosilicate glass, such as an alkaline earth boro-aluminosilicate glass or an alkali-free boro-aluminosilicate glass. According to non-limiting embodiments, the third and/or fourth glass layers can comprise float-formed glass. A thickness of the third and/or fourth glass layers can be less than about 2 mm or, in alternative embodiments, greater than about 1.5 mm.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and, together with the description, serve to explain the principles and operations of the disclosure.

BRIEF DESCRIPTION OF THE DRAWINGS

The following detailed description can be further understood when read in conjunction with the following drawings in which.

DETAILED DESCRIPTION

Various embodiments of the disclosure will now be discussed with reference to FIGS. 1-5, which illustrate exemplary embodiments of IGUs, and their components, features, or properties. The following general description is intended to provide an overview of the claimed devices, and various aspects will be more specifically discussed throughout the disclosure with reference to the non-limiting depicted embodiments, these embodiments being interchangeable with one another within the context of the disclosure.

Disclosed herein are insulated glass units comprising a first glass layer, a second glass layer, and a third glass layer disposed between the first and second glass layers, a first sealed gap space defined between the first and third glass layers, and a second sealed gap space defined between the second and third glass layers, wherein the third glass layer has a coefficient of thermal expansion (CTE) over a temperature range 0-300° C. of less than $70 \times 10^{-7}$/° C.

Also disclosed herein are insulated glass units comprising a first glass layer having a coefficient of thermal expansion $CTE_1$, a second glass layer having a coefficient of thermal expansion $CTE_2$, and a third glass layer disposed between the first and second glass layers and having a coefficient of thermal expansion $CTE_3$, a first sealed gap space defined between the first and third glass layers, and a second sealed gap space defined between the second and third glass layers, wherein at least one of: $CTE_1 > CTE_3$ or $CTE_2 > CTE_3$, as measured over a temperature range of 0-300° C.

Figure 1:
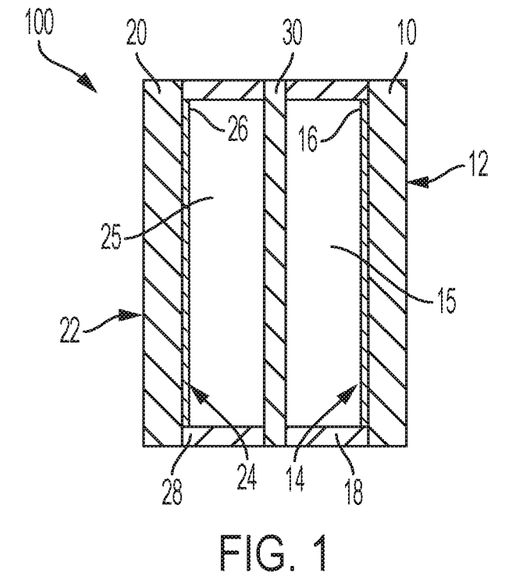
FIG. 1 is a cross-sectional view of a three-layer IGU according to embodiments of the disclosure.

An exemplary IGU 100 is illustrated in FIG. 1, the IGU comprising three glass layers 10, 20, and 30. A first (outer) glass layer 10 can be positioned such that its outer surface 12 faces the ambient external environment. A second (inner) glass layer 20 can be positioned such that its outer surface 22 faces the interior, e.g., inside a building, automobile, or appliance. A third (central) glass layer 30 can be disposed between and spaced apart from glass layers 10, 20. The third glass layer 30 can be positioned substantially parallel to the first and second glass layers 10, 20. Glass layers 10, 20, 30 can all be optically transparent, or one or more of the layers, or one or more portions thereof can be semi-transparent, opaque, or semi-opaque.

According to various embodiments, first and second glass layers 10, 20 may be thicker than third glass layer 30. In some embodiments, glass layers 10, 20 can have a thickness ranging from about 2 mm to about 10 mm, such as from about 3 mm to about 8 mm, from about 4 mm to about 7 mm, or from about 5 mm to about 6 mm, including all ranges and subranges therebetween. In a non-limiting embodiment, the first and second glass layers 10, 20 can comprise soda lime glass, although other glass types can be used without limitation, such as aluminosilicate and alkali aluminosilicate glasses, or other like glasses. The coefficient of thermal expansion (CTE) of the first and/or second glass layer 10, 20 may, in various embodiments, be greater than about $70 \times 10^{-7}$/° C., such as greater than about $75 \times 10^{-7}$/° C., greater than about $80 \times 10^{-7}$/° C., greater than about $85 \times 10^{-7}$/° C., greater than about $90 \times 10^{-7}$/° C., greater than about $95 \times 10^{-7}$/° C., or greater than about $10 \times 10^{-6}$/° C., including all ranges and subranges therebetween, e.g., ranging from about $70 \times 10^{-7}$/° C. to about $15 \times 10^{-6}$/° C.

According to various embodiments, one or both the first and second glass layers 10, 20 can be strengthened, e.g., by thermal tempering, chemical strengthening, or other like processes, to improve the mechanical strength of one or both of these layers. The first and second glass layers 10, 20 can, in some embodiments, be produced by float or fusion draw manufacturing processes.

In certain embodiments of the disclosure, the inner surface 14 of the first glass layer 10 can be partially or fully coated with at least one first coating 16, such as low emissivity coatings for improving thermal performance. Low emissivity coatings are known in the art and may include, without limitation, sputter-coated and pyrolytic coatings comprising, for example, one or more metals and/or metal oxides such as silver, titanium, and fluorine-doped tin oxide, to name a few. Alternatively, or additionally, the inner surface 24 of second glass layer 20 can be partially or fully coated with at least one second coating 26. The first and second coatings 16 and 26 can be the same or different depending upon the desired properties and/or end use of the IGU. Combinations of coatings may also be used. In various embodiments, one or both of coatings 16, 26 can be optically transparent.

In non-limiting embodiments, third glass layer 30 may be thinner than first and second glass layers 10, 20. In some embodiments, third glass layer 30 can have a thickness of less than about 2 mm, such as from about 0.1 mm to about 1.5 mm, from about 0.3 mm to about 1.2 mm, from about 0.5 mm to about 1 mm, from about 0.6 mm to about 0.9 mm, or from about 0.7 mm to about 0.8 mm, including all ranges and subranges therebetween. According to further embodiments, the third glass layer 30 may have a thickness greater than 1.5 mm, or even greater than 2 mm, such as ranging from about 1.5 mm to about 4 mm, or from about 2 mm to about 3.5 mm, or from about 2.5 mm to about 3 mm, including all ranges and subranges therebetween.

In a non-limiting embodiment, the third glass layer 30 can comprise a boro-aluminosilicate glass, such as an alkaline earth boro-aluminosilicate glass, or an alkali-free boro-aluminosilicate glass, or other similar glass types. Exemplary commercial glass products include, but are not limited to, Corning® Willow®, EAGLE XG®, and Lotus® glasses. According to various embodiments, third glass layer 30 can be strengthened, e.g., by thermal tempering, chemical strengthening, or other like processes, to improve the mechanical strength of this layer. The third glass layer 30 can, in some embodiments, be produced by float or fusion draw manufacturing processes.

According to various embodiments, the third glass layer 30 can have a low CTE as compared to the CTE of the first and/or second glass layers 10, 20. As used herein, CTE refers to the coefficient of thermal expansion of an identified glass layer as measured over a temperature range of 0-300° C., e.g., at a temperature of about 20° C. In certain embodiments, the CTE of the third glass layer ($CTE_3$) can be less than about $70 \times 10^{-7}/°$ C., such as less than about $60 \times 10^{-7}/°$ C., less than about $50 \times 10^{-7}/°$ C., less than about, less than about $45 \times 10^{-7}/°$ C., less than about $40 \times 10^{-7}/°$ C., less than about $35 \times 10^{-7}/°$ C., less than about $30 \times 10^{-7}/°$ C., or less than about $25 \times 10^{-7}/°$ C., including all ranges and subranges therebetween, e.g., ranging from about $10 \times 10^{-7}/°$ C. to about $70 \times 10^{-7}/°$ C. In additional embodiments, the CTE of the first glass layer ($CTE_1$) and/or the CTE of the second glass layer ($CTE_2$) can be greater than $CTE_3$, such as $CTE_1 > CTE_3$ and/or $CTE_2 > CTE_3$, or $CTE_1 \geq 2*CTE_3$ and/or $CTE_2 \geq 2*CTE_3$, or $CTE_1 \geq 2.5*CTE_3$ and/or $CTE_2 \geq 2.5*CTE_3$, or $CTE_1 \geq 3*CTE_3$ and/or $CTE_2 \geq 3*CTE_3$.

Although not illustrated in FIG. 1, one or both major surfaces of third glass layer 30 may be partially or fully coated with at least one coating, such as the low emissivity coatings discussed above with respect to coatings 16, 26. Alternatively, or additionally, one or both major surfaces of third glass layer 30 can be partially or fully patterned with ink and/or surface features, e.g., decorative ink, light scattering ink, and/or light scattering surface features. Bulk scattering features located within the glass matrix below the surface may also be provided in third glass layer 30, e.g., by laser patterning. Surface scattering features may also be produced by laser patterning. If a coating and/or pattern is provided on both major surfaces of third glass layer 30, these coatings and/or patterns can be the same or different depending upon the desired properties and/or end use of the IGU. Combinations of coatings and combinations of surface patterns may also be used. In additional embodiments, third glass layer 30 can comprise at least one coating and at least one of ink, surface features, and/or bulk features. Of course, the first and second glass layers 10, 20 can similarly be provided with such coatings, patterns, and/or features.

Referring again to FIG. 1, the third glass layer 30 and the outer glass layer 10 can be spaced apart and can define a first gap space 15 therebetween, and the third glass layer 30 and the second glass layer 20 can be spaced apart and can define a second gap space 25 therebetween. Both gap spaces 15, 25 can be hermetically sealed by a sealant assembly 18, 28, which may be identical or different. Exemplary sealant assemblies can be formed from polymeric-based seals or other sealing materials, such as silicone rubber. Gap spaces 15, 25 can be filled with inert gas, which may further improve the thermal performance of the IGU. Suitable inert glasses include, but are not limited to, argon, krypton, xenon, and combinations thereof. Mixtures of inert gases or mixtures of one or more inert gases with air can also be used. Exemplary non-limiting inert gas mixtures include 90/10 or 95/5 argon/air, 95/5 krypton/air, or 22/66/12 argon/krypton/air mixtures. Other ratios of inert gases or inert gases and air can also be used depending on the desired thermal performance and/or end use of the IGU. According to various embodiments, the gas used to fill gap spaces 15, 25 may be the same or different.

The gas pressure in first gap space 15 and second gap space 25 can be the same or different. The gas pressure difference may, for example, be due to a difference in the average gas temperature in the two spaces, e.g., gas in first gap space 15 may be warmer than gas in second gap space 25, or vice versa, depending on the relative ambient and interior temperatures. Differential pressure between the two gap spaces 15, 25 may be sufficient to bend or bow the third glass layer 30, depending on the thickness of this layer. To prevent bowing, at least one channel or opening in third glass layer 30 can be provided in some embodiments to allow gas in gap space 15 to contact gas in gap space 25. Openings may be provided, for example, by drilling one or more orifices or holes into the third glass layer 30.

Figure 3:
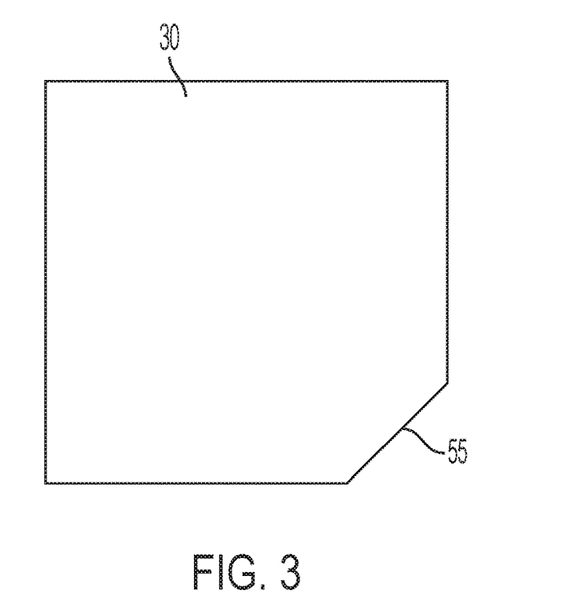
FIG. 3 is a front view of an exemplary central glass layer of an IGU according to embodiments of the disclosure.

Alternatively, as depicted in FIG. 3, one or more corners of third glass layer 30 may be truncated or clipped, e.g., by mechanical scoring and breaking or by laser cutting. The outer perimeter shape of the third glass layer 30 may thus be changed with a reduced chance of cracking and/or breaking the glass layer. When the third glass layer 30 is sealed within the IGU, the truncated corner 55 can provide a channel through which gas from gap spaces 15, 25 can contact each other. This contact can eliminate or reduce differential pressure between the two gap spaces and thereby reduce or eliminate bowing of the third glass layer 30.

Figure 2:
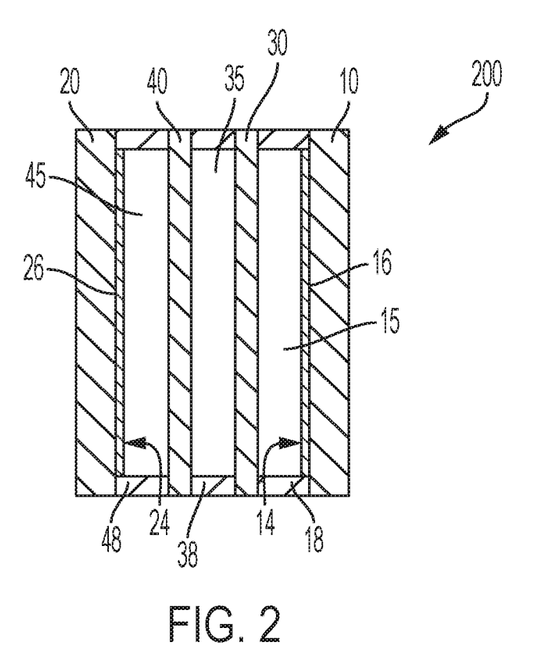
FIG. 2 is a cross-sectional view of a four-layer IGU according to embodiments of the disclosure.

Referring now to FIG. 2, an alternative IGU 200 is depicted, which comprises four glass layers 10, 20, 30, 40. The depicted embodiment is similar to that of FIG. 1, except the IGU 200 comprises an additional fourth (central) glass layer 40. The central glass layers 30, 40 are disposed between the first and second glass layers 10, 20.

In non-limiting embodiments, fourth glass layer 40 may be thinner than first and second glass layers 10, 20. In some embodiments, fourth glass layer 40 can have a thickness of less than about 2 mm, such as from about 0.1 mm to about 1.5 mm, from about 0.3 mm to about 1.2 mm, from about 0.5 mm to about 1 mm, from about 0.6 mm to about 0.9 mm, or from about 0.7 mm to about 0.8 mm, including all ranges and subranges therebetween. According to further embodiments, the fourth glass layer 40 may have a thickness greater than 1.5 mm, or even greater than 2 mm, such as ranging from about 1.5 mm to about 4 mm, or from about 2 mm to about 3.5 mm, or from about 2.5 mm to about 3 mm, including all ranges and subranges therebetween. The thickness of fourth glass layer 40 can be the same or different from the thickness of third glass layer 30.

In a non-limiting embodiment, the fourth glass layer 40 can comprise a boro-aluminosilicate glass, such as an alkaline earth boro-aluminosilicate glass, or an alkali-free boro-aluminosilicate glass, or other similar glass types. Exemplary commercial glass products include, but are not limited to, Corning® Willow®, EAGLE XG®, and Lotus® glasses. According to various embodiments, fourth glass layer 40 can be strengthened, e.g., by thermal tempering, chemical strengthening, or other like processes, to improve the mechanical strength of this layer. The fourth glass layer 40 can, in some embodiments, be produced by float or fusion draw manufacturing processes. The composition of fourth glass layer 40 can be the same or different from the composition of third glass layer 30. The mechanical properties, e.g., degree of strengthening, of the fourth glass layer 40 can similarly be the same or different from the mechanical properties of the third glass layer 30.

According to various embodiments, the fourth glass layer 30 can have a low CTE as compared to the CTE of the first and/or second glass layers 10, 20. In certain embodiments, the CTE of the fourth glass layer ($CTE_4$) can be less than about $70 \times 10^{-7}/°$ C., such as less than about $60 \times 10^{-7}/°$ C., less than about $50 \times 10^{-7}/°$ C., less than about $45 \times 10^{-7}/°$ C., less than about $40 \times 10^{-7}/°$ C., less than about $35 \times 10^{-7}/°$ C., less than about $30 \times 10^{-7}/°$ C., or less than about $25 \times 10^{-7}/°$ C., including all ranges and subranges therebetween, e.g., ranging from about $10 \times 10^{-7}/°$ C. to about $70 \times 10^{-7}/°$ C. In additional embodiments, the CTE of the first glass layer ($CTE_1$) and/or the CTE of the second glass layer ($CTE_2$) can be greater than $CTE_4$, such as $CTE_1 > CTE_4$ and/or $CTE_2 > CTE_4$, or $CTE_1 \geq 2*CTE_4$ and/or $CTE_2 \geq 2*CTE_4$, or $CTE_1 \geq 2.5*CTE_4$ and/or $CTE_2 \geq 2.5*CTE_4$, or $CTE_1 \geq 3*CTE_4$ and/or $CTE_2 \geq 3*CTE_4$. $CTE_3$ and $CTE_4$ may be identical or different. According to non-limiting embodiments, $CTE_3$ is substantially equal to $CTE_4$.

Although not illustrated in FIG. 2, one or both major surfaces of third glass layer 30 and/or fourth glass layer 40 may be partially or fully coated with at least one coating, such as the low emissivity coatings discussed above with respect to coatings 16, 26 (see FIG. 1). Alternatively, or additionally, one or both major surfaces of third glass layer 30 and/or fourth glass layer 40 can be partially or fully patterned with ink and/or surface features, e.g., decorative ink, light scattering ink, and/or light scattering surface features. Bulk scattering features located within the glass matrix below the surface may also be provided in the third and/or fourth glass layers 30, 40 e.g., by laser patterning. Surface scattering features may also be produced using laser patterning. Coatings and/or surface patterns on one or both major surfaces of third and/or fourth glass layers 30, 40 can be the same or different depending upon the desired properties and/or end use of the IGU. Combinations of coatings and combinations of surface patterns may also be used. In additional embodiments, third and/or fourth glass layers 30, 40 can comprise at least one coating and at least one of ink, surface features, and/or bulk features.

Third glass layer 30 and the outer glass layer 10 can be spaced apart and can define a first gap space 15 therebetween, third glass layer 30 and fourth glass layer 40 can be spaced apart and can define a third gap space 35 therebetween, and fourth glass layer 40 and interior glass layer 20 can be spaced apart and can define a fourth gap space 45 therebetween. Gap spaces 15, 35, 45 can be hermetically sealed by a sealant assembly 18, 38, 48, which may be identical or different. Exemplary sealant assemblies are disclosed above and exemplary inert gases and inert gas mixtures for filing the gap spaces are disclosed above with reference to FIG. 1. According to various embodiments, the gas used to fill gap spaces 15, 35, 45 may be the same or different. Fourth glass layer 40 may also comprise one or more truncated corners (see FIG. 3).

Referring to FIGS. 1-2, the thickness of gap spaces 15, 25, 35, 45 can vary depending on the IGU configuration and may range, for example, from about 6 mm to about 18 mm, such as from about 7 mm to about 16 mm, from about 8 mm to about 14 mm, or from about 10 mm to about 12 mm, including all ranges and subranges therebetween. The thickness of gap spaces 15, 25 (FIG. 1) or gap spaces 15, 35, 45 (FIG. 2) may be the same or different. A total thickness of the IGU 100 can be about 40 mm or less, such as about 36 mm or less, about 32 mm or less, about 30 mm or less, about 28 mm or less, or about 26 mm or less, including all ranges and subranges therebetween. In some embodiments, low U-values, indicative of improved insulative properties, can be obtained when the gap space thickness ranges from about 14 mm to about 16 mm and the total thickness of the IGU 100 ranges from about 36 mm to about 40 mm. A total thickness of the IGU 200 can be about 60 mm or less, such as about 56 mm or less, about 54 mm or less, about 50 mm or less, about 40 mm or less, about 30 mm or less, or about 26 mm or less, including all ranges and subranges therebetween. In some embodiments, low U-values, indicative of improved insulative properties, can be obtained when the gap space thickness ranges from about 16 mm to about 18 mm and the total thickness of the IGU 200 ranges from about 54 mm to about 60 mm.

It should be noted that while the glass layers of FIGS. 1-3 are referred to herein as single glass sheets, the claims appended herewith should not be so limited, as the glass layers can comprise a glass laminate structure including a glass-polymer laminate structure or a glass-glass laminate structure. Suitable glass-polymer laminate structures include a single sheet of glass laminated to a polymeric film, two sheets of glass having an intermediate polymeric film, and the like. Suitable glass-glass laminate structures include a structure having an inner glass core and one or two outer glass clad layers. In some embodiments, the laminate can comprise two or more glass layers, such as three or more glass layers, the glass layers being chosen from alkaline earth boro-aluminosilicate glass, alkali-free boro-aluminosilicate glass, and soda lime glass. Exemplary glass-glass laminate structures and methods of making are described in co-owned U.S. Pat. No. 8,007,913, U.S. Patent Publication Nos., 2013/0015180 and 2013/312459, and International Publication No. WO14/018838, the entirety of each being incorporated herein by reference.

The IGUs disclosed herein may be employed in various applications, such as windows, doors, and skylights in buildings and other architectural applications, as windows in automobiles and other automotive applications, as windows or display panels in appliances, and as display panels in electronic devices, to name a few. According to various embodiments, one or more LEDs may be optically coupled to at least one edge of the IGU to provide illumination across one or more regions of the IGU. Edge lighting can, for instance, provide illumination that mimics sunlight, which can be useful in a variety of architectural and automotive applications, e.g., sky lights and sunroofs. As discussed above, one or more glass layers in the IGU can be provided with bulk or surface light scattering features, which can promote the uniformity of light transmitted by the IGU. Low CTE glass may, in some embodiments, be more easily laser processed to produce such light scattering features as compared to higher CTE glass, which often cracks or develops other defects during laser patterning.

In various non-limiting embodiments, using low CTE glass for the center glass layer(s), e.g., the third and/or fourth glass layers, can provide several advantages over conventional IGUs. For example, a low CTE center glass layer can have improved resistance to thermal stresses and/or breakage caused by temperature gradients across the IGU. Manufacturing costs may thus be lowered by eliminating the thermal tempering step that would otherwise be used to strengthen a center glass layer comprising a conventional glass with a higher CTE, such as a soda lime glass.

Because thermal tempering of the center glass layer can be avoided, the optical performance of the IGU may be improved, e.g., due to the lack of warp or birefringence caused by such a treatment step. The absence of a thermal tempering step can also allow for a thinner center glass layer, resulting in a reduced thickness and/or weight of the overall IGU. Reduced IGU weight can result in cost savings during manufacture, transport, installation, maintenance, and/or operation. Reduced IGU thickness can expand the range of applications for the IGU that might otherwise be limited by design constraints.

A thinner low CTE center layer can also allow for wider sealed gap spaces between the glass layers. A larger volume of insulating gas in the sealed gap spaces can improve the energy efficiency of the IGU. IGUs with narrow sealed gap spaces may have an increased risk of bowing due to contraction of gas within the gap spaces, which can lead to contact between the outer glass layers and the center glass layer(s). Such contact is cosmetically undesirable and also permits direct conduction of heat between the glass layers, which can be unacceptable from an energy standpoint. Use of thinner low CTE center glass layers can provide wider gaps and therefore reduce the potential risk of bowing and/or contact between glass layers.

Thermal stress leading to glass breakage in the IGU can be caused, e.g., by rapid temperature changes of one region of the IGU relative to another region of the IGU. For instance, a rapid rise in external (ambient) temperature as compared to the interior temperature, or vice versa, may produce thermal stress on one or more regions of the IGU. On a cold morning, sunlight incident on a window can rapidly raise the temperature of the regions of the IGU exposed to the sunlight, while the perimeter of the IGU, e.g., disposed under a window frame, remains cold. Finite element analysis (FEA) modeling shows that the resulting thermal stress on the center glass layer can reach about 0.62 MPa/° C. of temperature difference for traditional soda lime glass. In summertime conditions, (e.g., ~28° C.), the center glass layer can reach temperatures as high as 60° C., resulting in a temperature difference as great as 40° C. between the center glass layer and the outer glass layers. The resulting thermal stress on a center layer comprising soda lime glass can thus be about 25 MPa or greater.

Soda lime glass has a CTE of approximately $90 \times 10^{-7}/°$ C. By comparison, Corning® EAGLE XG® glass has a CTE of $31.7 \times 10^{-7}/°$ C., approximately ⅓ of the CTE of soda lime glass. Under the same 40° thermal gradient described above, a center layer comprising EAGLE XG® glass would experience only 8.7 MPa of thermal stress, resulting in a lower risk of breakage, even without thermal tempering or chemical strengthening.

Modeling was carried out to evaluate the use of low CTE glass as a center glass layer between two higher CTE glass layers in an IGU. The model assumed a three-layer IGU (length=1265 mm, width=989 mm) with an outer glass layer comprising soda lime glass (thickness=4 mm), an inner glass layer comprising soda lime glass (thickness=6 mm), and a center glass layer comprising EAGLE XG® glass (thickness=0.7 mm). The gaps between the center glass layer and the inner and outer glass layers were 12 mm wide, filled with argon gas, and sealed with a silicone rubber perimeter seal.

Figure 4:
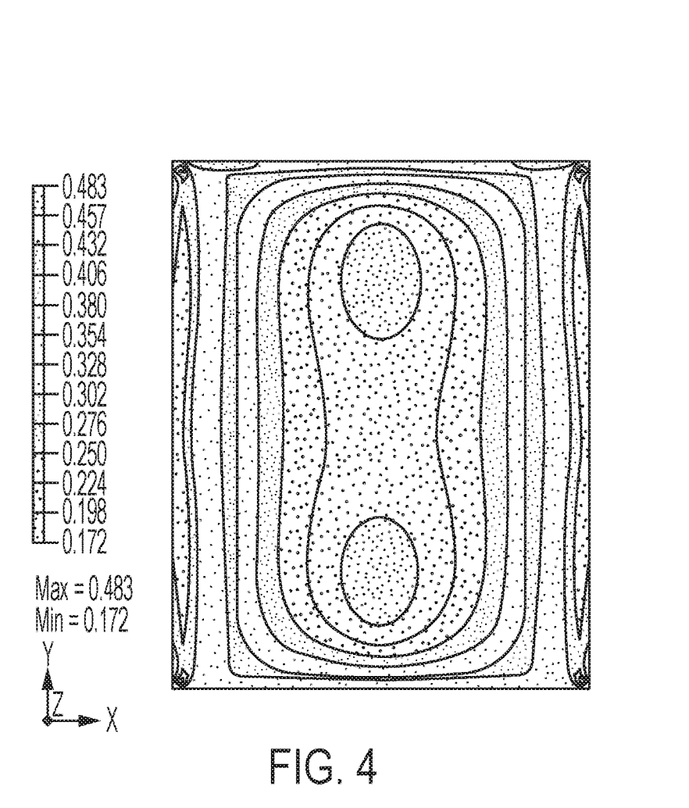
FIG. 4 illustrates the max principle stress on a central layer of EAGLE XG® glass in a three-layer IGU at +60° C.
Figure 5:
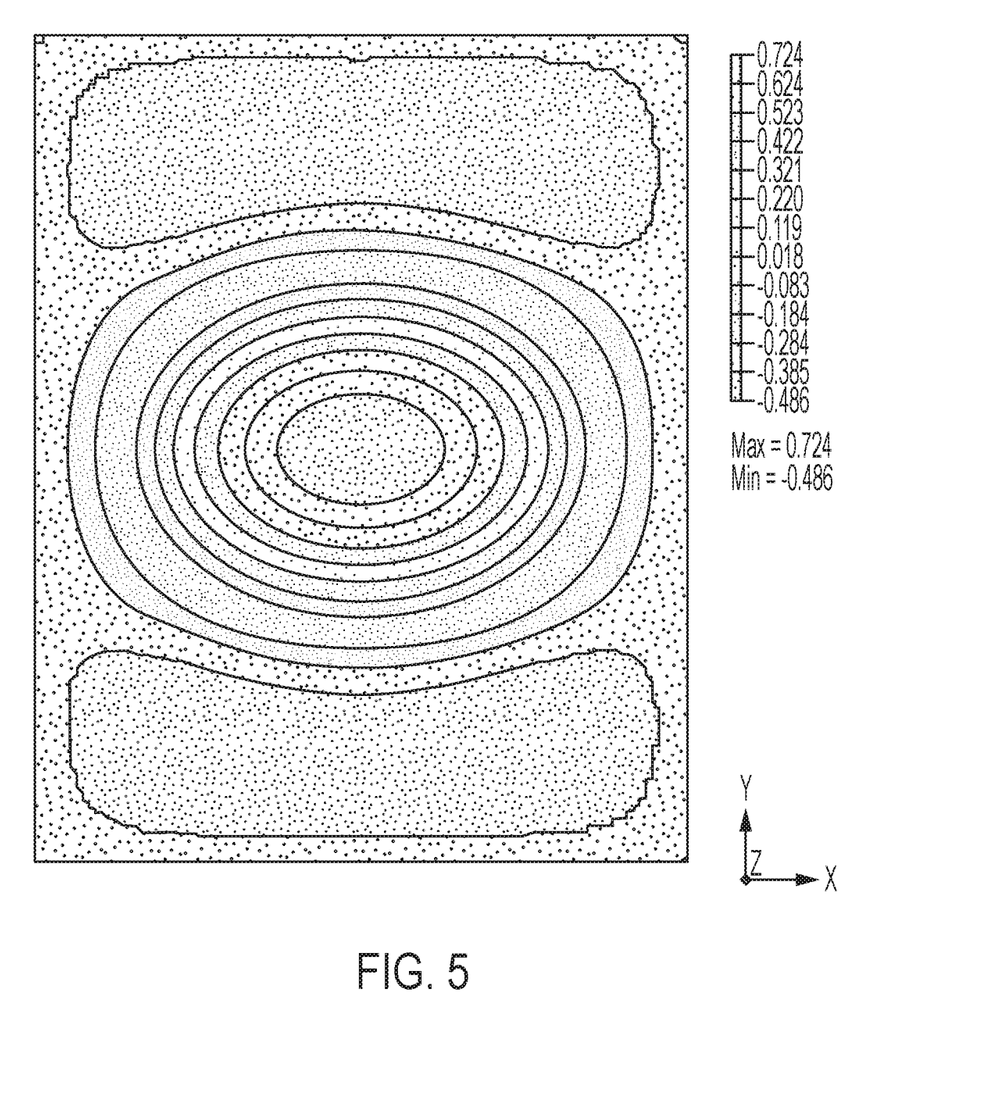
FIG. 5 illustrates the deflection of a central layer of EAGLE XG® glass in a three-layer IGU at −40° C.

Referring to FIG. 4, tensile stress on the EAGLE XG® center glass layer was modeled at +60° C. to simulate a scenario in which the soda lime glass layers expand due to elevated temperature. FIG. 5 is a model of compressive stress on the EAGLE XG® center glass layer at −40° C. to simulate a scenario in which the soda lime glass layers contract due to reduced temperature. FIG. 4 shows that the max principal stress on the EAGLE XG® center glass layer at +60° C. is less than 1 MPa, and FIG. 5 shows that deflection of the EAGLE XG® center glass layer is under 1 mm, indicating that the modeled IGU can suitably withstand breakage, warping, and/or buckling due to thermal stresses induced by both high and low temperature gradients.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a component" includes examples having one such "component" or two or more such "components" unless the context clearly indicates otherwise. Similarly, a "plurality" or an "array" is intended to denote two or more, such that an "array of components" or a "plurality of components" denotes two or more such components.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device comprising A+B+C include embodiments where a device consists of A+B+C, and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An insulated glass unit comprising:
   a first glass layer;
   a second glass layer;
   a third glass layer disposed between the first and second glass layers;
   a first sealed gap space defined between the first glass layer and the third glass layer; and
   a second sealed gap space defined between the second glass layer and the third glass layer;
   wherein the third glass layer has a coefficient of thermal expansion (CTE) over a temperature range 0-300° C. of less than $70 \times 10^{-7}/°$ C. and a thickness from 0.3 mm to 0.9 mm.

2. The insulated glass unit of claim 1, wherein the third glass layer comprises a boro-aluminosilicate glass.

3. The insulated glass unit of claim 2, wherein the third glass layer comprises an alkaline earth boro-aluminosilicate glass or an alkali-free boro-aluminosilicate glass.

4. The insulated glass unit of claim 1, wherein the third glass layer comprises float-formed glass.

5. The insulated glass unit of claim 1, wherein the third glass layer has a thickness from 0.5 mm to 0.9 mm.

6. The insulated glass unit of claim 1, wherein the third glass layer has a thickness from 0.6 mm to 0.9 mm.

7. The insulated glass unit of claim 1, wherein at least one of the first and second glass layers has a thickness of greater than 2 mm.

8. The insulated glass unit of claim 1, wherein at least one of the first, second, and third glass layers is chemically strengthened or thermally tempered.

9. The insulated glass unit of claim 1, wherein at least one of the first, second, and third glass layers is a glass laminate.

10. The insulated glass unit of claim 1, wherein at least one of an inner surface of the first glass layer, an inner surface of the second glass layer, or a major surface of the third glass layer is coated with at least one low emissivity coating.

11. The insulated glass unit of claim 1, wherein at least one major surface of the third glass layer is at least partially patterned with ink or light scattering features.

12. The insulated glass unit of claim 1, wherein at least one of the first sealed gap space and the second sealed gap space is filled with at least one insulating gas or a mixture thereof with air.

13. The insulated glass unit of claim 1, further comprising a fourth glass layer disposed between the first glass layer and the second glass layer, and a third sealed gap space defined between the third glass layer and the fourth glass layer.

14. The insulated glass unit of claim 13, wherein the fourth glass layer has a coefficient of thermal expansion (CTE) over a temperature range 0-300° C. of less than $70 \times 10^{-7}$/° C. and a thickness of 0.3 mm to 1.2 mm.

15. The insulated glass unit of claim 14, wherein the fourth glass layer comprises a boro-aluminosilicate glass.

16. The insulated glass unit of claim 14, wherein the fourth glass layer has a thickness of 0.5 mm to 1 mm.

* * * * *